United States Patent
Lundahl (10) Patent No.: US 9,842,243 B2
(45) Date of Patent: *Dec. 12, 2017

(54) FINGERPRINT SENSING DEVICE WITH HETEROGENEOUS COATING STRUCTURE COMPRISING A MOLD

(71) Applicant: Fingerprint Cards AB, Göteborg (SE)

(72) Inventor: Karl Lundahl, Göteborg (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,525

(22) Filed: Apr. 26, 2016

(65) Prior Publication Data
US 2016/0354801 A1 Dec. 8, 2016

(30) Foreign Application Priority Data
Jun. 8, 2015 (SE) ........................ 1550749

(51) Int. Cl.
*G06K 9/00* (2006.01)
(52) U.S. Cl.
CPC ........... *G06K 9/00053* (2013.01); *G06K 9/00* (2013.01)
(58) Field of Classification Search
CPC ..... H01L 2924/3011; H01L 2924/3025; H01L 2224/48247; H01L 2224/11; H01L 2924/00; H01L 2924/1815; H01L 33/58; H01L 2924/14; H01L 2224/03; H01L 2224/05553; H01L 2924/13063; H01L 24/48; H01L 2224/80; H01L 27/14806; H01L 21/308; H01L 2224/0362; H01L 2224/05599; H01L 2224/80895; H01L 24/03; H01L 24/05; G06K 9/00006; G06K 9/00013; G06K 9/00912; G06K 9/0002; G06K 9/00053; G06K 19/07756; G06K 9/00026; G06F 21/32; G06F 21/82; G06F 3/044; G06F 3/041; G06F 3/0416; G06F 3/0436; G06F 3/0412; G06F 2203/04104; G06F 3/0414; G06F 2203/04103;
(Continued)

(56) References Cited

U.S. PATENT DOCUMENTS 6,330,145 B1 * 12/2001 Lepert ................ G06K 9/00053
361/220
8,717,775 B1 * 5/2014 Bolognia ........... G06K 9/00053
361/761
(Continued)

FOREIGN PATENT DOCUMENTS

WO 9852145 11/1998

*Primary Examiner* — Aklilu Woldemariam
(74) *Attorney, Agent, or Firm* — RMCK Law Group, PLC (57) ABSTRACT

The invention relates to a fingerprint sensing device comprising a sensing chip comprising an array of capacitive sensing elements. The sensing device comprises a coating material arranged in a layer on top of the array of sensing elements, the coating material comprising a plurality of cavities filled with a mold material; wherein locations of the cavities correspond to locations of the sensing elements, such that a cross-section area of a cavity covers at least a portion of an area of a corresponding sensing element; and wherein a dielectric constant of the mold material is higher than a dielectric constant of the coating material. The invention also relates to a method for manufacturing such a device.

18 Claims, 9 Drawing Sheets

(58) Field of Classification Search
CPC .......... G06F 2203/04106; G06F 21/83; G06F 2203/0338; G06F 2203/04111; G06F 21/86; G07C 2009/00095; G07C 9/00174; G07C 9/00071; G07C 9/00158; Y10S 257/914; Y10S 438/931; H03K 17/962; H03K 2217/960785; A61B 5/117; A61B 5/1172; H04N 21/4415; Y10T 29/49155; Y10T 29/49002; H04L 63/0861; C12Q 1/6869; C12Q 1/6874; G01N 27/27; G01N 27/414; G01N 27/4145; G01N 33/54313; G01S 15/02; G01S 7/52017; G07D 7/02; G07D 7/04; G07D 7/2033; H05K 1/189; H05K 2201/10151; B60C 11/243; B60C 23/0449; G01D 21/00; G01F 23/26; G01F 23/263; G01F 23/268; G01F 23/284; G01L 19/086; H01Q 1/2208
USPC .............. 257/341, 342, 350, 226, 233, 207; 345/173, 174, 207; 382/124, 312
See application file for complete search history.

(56) References Cited

U.S. PATENT DOCUMENTS

| | | | | |
|---|---|---|---|---|
| 8,803,258 B2* | 8/2014 | Gozzini | ............. | G06K 9/00053 257/415 |
| 2002/0160363 A1* | 10/2002 | McDevitt | ................ | C12Q 1/37 435/6.12 |
| 2004/0180203 A1* | 9/2004 | Yadav | .................... | A61L 27/06 428/402 |
| 2004/0185590 A1* | 9/2004 | Miyai | ................ | G06K 9/00053 438/48 |
| 2005/0259853 A1* | 11/2005 | Miyai | ................ | G06K 9/00053 382/124 |
| 2007/0229470 A1* | 10/2007 | Snyder | .................... | G06F 3/011 345/173 |
| 2008/0210757 A1* | 9/2008 | Burden | .................... | G07D 7/02 235/449 |
| 2009/0067690 A1* | 3/2009 | Mainguet | ........... | G06K 9/00053 382/124 |
| 2010/0271330 A1* | 10/2010 | Philipp | .................... | G06F 3/044 345/174 |
| 2011/0254108 A1* | 10/2011 | Gozzini | ............. | G06K 9/00053 257/415 |
| 2011/0267298 A1* | 11/2011 | Erhart | .................... | G06F 1/1626 345/173 |
| 2012/0065617 A1* | 3/2012 | Matsiev | ............. | G01N 27/4166 604/503 |
| 2012/0299175 A1* | 11/2012 | Tran | ........................ | B82Y 10/00 257/712 |
| 2013/0201153 A1* | 8/2013 | Schneider | ............... | G06F 3/044 345/174 |
| 2013/0259329 A1* | 10/2013 | Wickboldt | ............. | H05K 1/189 382/124 |
| 2014/0103943 A1 | 4/2014 | Dunlap et al. | | |
| 2014/0333328 A1* | 11/2014 | Nelson | .................... | G06F 3/044 324/663 |
| 2015/0091588 A1* | 4/2015 | Wickboldt | ......... | G06K 9/00013 324/661 |
| 2015/0091859 A1* | 4/2015 | Rosenberg | ............. | G06F 3/044 345/174 |
| 2015/0198699 A1* | 7/2015 | Kuo | .................... | G01S 7/52017 367/7 |

\* cited by examiner

FINGERPRINT SENSING DEVICE WITH HETEROGENEOUS COATING STRUCTURE COMPRISING A MOLD

CROSS REFERENCE TO RELATED APPLICATIONS

This application claims the benefit of Swedish Patent Application No. 1550749-4 filed Jun. 8, 2015. The disclosure of the above application is incorporated herein by reference in its entirety.

FIELD OF THE INVENTION

The present invention relates to a coating structure for a fingerprint sensor. In particular, the present invention related to a heterogeneous coating structure for enhancing the performance in a fingerprint sensor.

BACKGROUND OF THE INVENTION

As the development of biometric devices for identity verification, and in particular of fingerprint sensing devices, has lead to devices which are made smaller, cheaper and more energy efficient, the possible applications for such devices are increasing.

In particular fingerprint sensing has been adopted more and more in, for example, consumer electronic devices, due to small form factor, relatively beneficial cost/performance factor and high user acceptance.

Capacitive fingerprint sensing devices, built based on CMOS technology for providing the fingerprint sensing elements and auxiliary logic circuitry, are increasingly popular as such sensing devices can be made both small and energy efficient while being able to identify a fingerprint with high accuracy. Thereby, capacitive fingerprint sensors are advantageously used for consumer electronics, such as portable computers, tablet computers and mobile phones, e.g. smartphones.

A fingerprint sensing chip typically comprises an array of capacitive sensing elements providing a measure indicative of the capacitance between several sensing structures and a finger placed on the surface of the fingerprint sensor. The sensing chip may further comprise logic circuitry for handling addressing of the array of sensing elements.

A typical fingerprint sensor is protected so that the fingers do not come in physical contact with the sensing elements. In particular, it may be desirable to arrange a glass plate on top of the sensor for protecting the sensor, or to arrange the sensor behind a display glass. By arranging elements between the sensing surface and the sensing elements, the distance between the sensing surface and the sensing elements increases which reduces the capacitive coupling between a finger placed a sensing surface of the device and the capacitive sensing elements. This in turn leads to an image blurring effect. As a function of an increased distance between a finger and any given pixel, each pixel is starting to receive signals from areas that are not immediately located vertically on top of said pixel resulting in image blurring negatively impacting the capabilities of the sensors to resolve fine features in a fingerprint.

In view of the above, it is desirable to improve the capacitive coupling between a finger placed on the sensing surface and the sensing elements.

US2013/0201153 discloses a fingerprint sensing device where electrically conductive strands are arranged between the sensing surface and the sensing elements of a fingerprint sensing device. An insulating material is arranged between conductive strands. However, a direct electrical contact between the finger and the pixel may cause problems related to electrostatic discharge (ESD). Moreover, the metallic portions of the surface may oxidize, resulting in undesirable aesthetic effects.

SUMMARY

In view of above-mentioned desirable properties of a fingerprint sensing device, and drawbacks of prior art, it is an object of the present invention to provide a fingerprint sensing device and a method for manufacturing a fingerprint sensing device which provides an improved capacitive coupling between a finger placed on a sensing surface and the sensing elements of the sensing device.

According to a first aspect of the invention, there is provided a method for manufacturing a fingerprint sensing device, the method comprising; providing a sensing chip comprising an array of sensing elements, the sensing elements being configured to be connected to readout circuitry for detecting a capacitive coupling between each of the sensing elements and a finger placed on a sensing surface of the sensing device; depositing a layer of a coating material covering the array of conductive sensing elements; forming a plurality of cavities in the coating material, wherein locations of the cavities correspond to locations of the sensing elements such that a cross-section area of a cavity covers at least a portion of an area of a corresponding sensing element; wherein forming the cavities comprises forming openings between adjacent cavities so that a liquid mold can flow between adjacent cavities, and filling the cavities with a mold material, the mold material having a dielectric constant higher than a dielectric constant of the coating material.

The sensing chip should in the present context be understood as a chip comprising a plurality of sensing elements in the form of conductive plates or pads, typically arranged in an array, which are capable of forming a capacitive coupling between each sensing element and a finger placed on an exterior surface of the fingerprint sensing device. Through readout of the capacitive coupling for each sensing element, ridges and valleys of a fingerprint can be detected as a result of the distance dependence of the capacitive coupling. To achieve a fingerprint image with sufficient resolution, the sensing elements are typically substantially smaller than the features (ridges and valleys) of the finger. In general, a chip may also be referred to as a die.

The sensing device according to various embodiments of the invention may be formed on a conventional rigid PCB substrate or it may be implemented using a flexible type of substrate.

An improved capacitive coupling between a finger and a sensing element can be achieved by forming a heterogeneous coating layer where portions of the layer above the sensing elements have a higher dielectric constant than surrounding portion, thereby focusing the electric field towards the respective sensing element. Furthermore, the present invention is based on the realization that the mold used to cover and protect the sensing device can be used to achieve this effect by selecting or forming a mold material having a dielectric constant which is higher than the surrounding coating material. Thereby, an improved capacitive coupling can be achieved without substantial alterations of the material stack, meaning that conventional manufacturing processes may be used.

That a cross-section area of a cavity covers at least a portion of an area of a corresponding sensing element means should be interpreted to mean that the cavity may or may not cover the complete area of the sensing element. Moreover, it is not required that the cavity is centered over the sensing element, although it very well may be.

Furthermore, it is important to note that the cavity should be understood as a cavity in the coating material, which is subsequently filled with a mold material.

The coating material may refer to any material which is arranged to cover the sensing chip and in particular the sensing elements. The coating material is often referred to as wafer coating.

The coating material may comprise one cavity for each sensing element. Although it is not strictly required that there is a 1:1 ratio of the number of cavities to the number of sensing elements, this is most likely how the greatest improvement in capacitive coupling can be achieved. However, there may be instances where it is desirable to only have cavities over some of the sensing elements. For example, for various reasons it may be difficult to separate adjacent cavities, in which case a pattern where cavities are only located above a select number of sensing elements can be utilized.

According to one embodiment of the invention, the step of filling the cavities with a mold material may advantageously comprise compression molding. Moreover, the step of compression molding may comprise dispensing granulated mold particles on the layer of coating and in the cavities; heating the mold granulate and applying a pressure to the mold granulate. Compression molding enables filling of small structures such as the cavities of the present sensing device. In comparison, transfer molding, also referred to as injection molding, could most likely not be used to fill the cavities of the present structure since in transfer molding, the mold is required to travel a distance before reaching some of the cavities to fill. As the mold is transferred, it also begins to cure, which makes transfer molding unsuitable for filling the type of cavities discussed herein.

According to one embodiment of the invention the coating layer may advantageously be deposited by spin coating or by spray coating, which can be done on a full wafer thereby providing a large-scale efficient process. Using spin coating or spray coating also allows the process to be easily modified with respect to the desired thickness of the coating layer. The coating material is preferably arranged in a homogeneous layer on the sensing chip to cover the sensing elements, which also can be achieved by spin and spray coating.

According to one embodiment of the invention, the dielectric constant of the mold material may be in the range of 5-100 and the dielectric constant of the coating material may be in the range of 2-5. The specified ranges are should be seen as exemplary ranges providing the desired effect. The mold material and the coating material may have dielectric constants outside of the specified ranges within the scope of various embodiments of the present invention.

Furthermore, the ratio between the dielectric constant of the mold material and the dielectric constant of the coating material may advantageously be selected to be equal to or larger than 2:1. With respect to the focusing effect, it is the ratio between the two dielectric constants which determines the amount of focusing, where a higher ratio provides a better focus. It should be noted that the above mentioned dielectric constants and ratio is merely an example, and that a desired advantageous effect can be achieved with in principle any ratio higher than 1, although the effect is increasing with increasing ratio.

In one embodiment of the invention, the mold material may advantageously comprise filler particles having a dielectric constant higher than an average dielectric constant of the mold material, which is one way of tailoring the average dielectric constant of the mold material. The filler particles may be referred to as dielectric filler particles or high-k filler particles. Thereby, the dielectric constant of the mold material can be selected so that a desirable ratio can be achieved for different choices of coating material. Moreover, one and the same mold material can be used while providing different dielectric constants depending on what is required for a particular application. This simplifies the manufacturing process since there is no need to adjust the process for different mold materials.

According to one embodiment of the invention, the filler particles may advantageously comprise a ferroelectric material, such as barium titanate ($BaTiO_3$). There is a range of ferroelectric materials which have a high dielectric constant, and which may be suitable for use as filler material. Other filler particles may of course also be used, such as aluminum oxide ($Al_2O_3$). One desirable property is that the filler material should be possible to be provided in a form which may be evenly mixed with a mold material, and that the filler material does not agglomerate in the mold material since it is important that the dielectric constant of the mold material is at least approximately homogeneous over the entire surface of the sensing device.

In one embodiment of the invention, each of the cavities may advantageously comprise at least one lateral opening connecting the cavity to at least one adjacent cavity, enabling a flow of the mold material between adjacent cavities when depositing the mold material. During manufacturing of the fingerprint sensing device, the mold material is provided by compression molding where the mold is heated to become fluid and then compressed to fill the cavities in the coating layer. It is desirable to achieve a homogeneous thickness distribution of the mold materiel to provide uniformity in measurements over the entire sensing surface. In particular, it is desirable to avoid air-filled cavities. By means of the lateral openings in the coating layer, fluidly connecting adjacent cavities, the mold material can flow between the cavities to form an even mold layer covering the sensing device.

According to one embodiment of the invention, the openings are preferably larger than a maximum size of the filler particles in the mold material. Since it is desirable to achieve an even distribution of the mold material, it is preferred that the openings between adjacent cavities are larger than the dielectric filler particles so that the filler particles may flow freely between adjacent cavities, and that they not block the openings.

According to one embodiment of the invention, the coating material may advantageously be a photoresist. By using a photoresist, the cavities can be formed using conventional photolithography and development processes, which simplifies the overall process flow. Moreover, a photoresist can easily be tailored to have a specific dielectric constant so that a desired ratio of dielectric constants can be achieved. Furthermore, a photoresist can be deposited on a full wafer with a high degree of accuracy and thickness uniformity, using for example spin coating or spray coating.

In one embodiment of the invention the, the method may further comprise plasma cleaning of the coating material prior to the step of providing the mold material. The plasma cleaning of the surface of the coating material improves the wetting of the coating which in turn improves the filling of the cavities by the mold material. Plasma cleaning also provides a surface with improved adhesion to the mold material.

According to one embodiment of the invention, the method may further comprise depositing an adhesive on the mold material; and attaching a protective plate to the fingerprint sensing device by means of the adhesive. The protective plate typically comprises a dielectric material in order to provide a good capacitive coupling between a finger placed on the plate and the sensing elements of the sensing chip. In particular, the protective plate may advantageously comprise a glass or ceramic material, such as a chemically strengthened glass, $ZrO_2$ or sapphire. The aforementioned materials all provide advantageous properties in that they are hard and thereby resistant to wear and tear, and in that they are dielectric thereby providing a good capacitive coupling between a finger placed on the surface of the protective plate and the sensing element of the sensing device. The protective plate described herein commonly forms the outer surface of the fingerprint sensing device, also referred to as the sensing surface.

Moreover, the adhesive used to attach the protective plate to the sensing chip may advantageously have the same dielectric constant as the mold material, so that it does not influence the field properties between a the protective plate and the sensing elements.

According to a second aspect of the invention, there is provided a fingerprint sensing device comprising: a sensing chip comprising an array of sensing elements, the sensing elements being configured to be connected to readout circuitry for detecting a capacitive coupling between each of the sensing elements and a finger placed on a sensing surface of the sensing device; a coating material arranged in a layer on top of the array of sensing elements, the coating material comprising a plurality of cavities filled with a mold material, wherein the mold material is deposited by compression molding; wherein locations of the cavities correspond to locations of the sensing elements, such that a cross-section area of a cavity covers at least a portion of an area of a corresponding sensing element; and wherein a dielectric constant of the mold material is higher than a dielectric constant of the coating material.

Advantages, effects and features of the second aspect of the invention are largely analogous to those described above in connection with the first aspect of the invention.

There is also provided a method for manufacturing a fingerprint sensing device, the method comprising; providing a sensing chip comprising an array of sensing elements, the sensing elements being configured to be connected to readout circuitry for detecting a capacitive coupling between each of the sensing elements and a finger placed on a sensing surface of the sensing device; depositing a layer of a coating material covering the array of conductive sensing elements; forming a plurality of trenches in the coating material, wherein locations of the trenches correspond to areas between adjacent sensing elements; filling the trenches with an mold material, the mold material having a dielectric constant lower than a dielectric constant of the coating material.

The trenches in the coating material can be considered to follow the alignment of the border between sensing elements. Typically, the sensing elements are arranged in a square array with a certain pitch, here defined as the center-to-center distance of the sensing elements, where the pitch is larger than the size of the sensing element, thereby forming an unoccupied area between adjacent sensing elements.

By providing a mold material in the trenches, where the dielectric constant of the mold material is lower than a dielectric constant of the coating material, a heterogeneous coating layer is provided and the focusing effect discussed in relation to the first aspect of the invention is achieved.

Moreover, the step of filling the trenches with a mold material may advantageously comprise compression molding.

There is also provided a fingerprint sensing device comprising: a sensing chip comprising an array of sensing elements, the sensing elements being configured to be connected to readout circuitry for detecting a capacitive coupling between each of the sensing elements and a finger placed on a sensing surface of the sensing device; a coating material arranged in a layer on top of the array of sensing elements, the coating material comprising a plurality of trenches filled with a mold material, wherein locations of the trenches correspond to areas between adjacent sensing elements; wherein the mold material is deposited by compression molding; and wherein a dielectric constant of the mold material is lower than a dielectric constant of the coating material.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of a fingerprint sensing device according to the present invention are mainly discussed with reference to a capacitive fingerprint sensing device. A method for manufacturing a fingerprint sensing device is also discussed.

Figure 1:
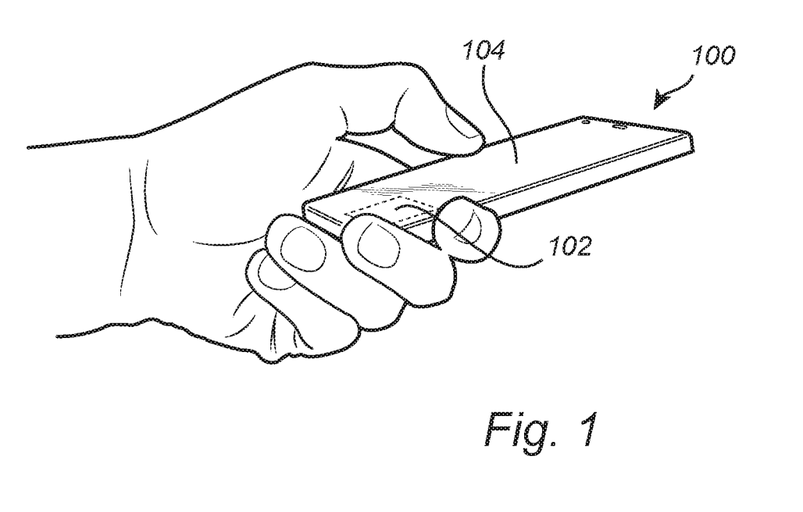
FIG. 1 schematically illustrates a handheld electronic device comprising a fingerprint sensing device according to an embodiment of the invention.

FIG. 1 is a schematic illustration of a handheld device 100 comprising a fingerprint sensing device 102 comprising a touchscreen display 104. A fingerprint sensing device 102 can be used in for example a mobile phone, a tablet computer, a portable computer or any other electronic device requiring a way to identify and/or authenticate a user.

Figure 2A:
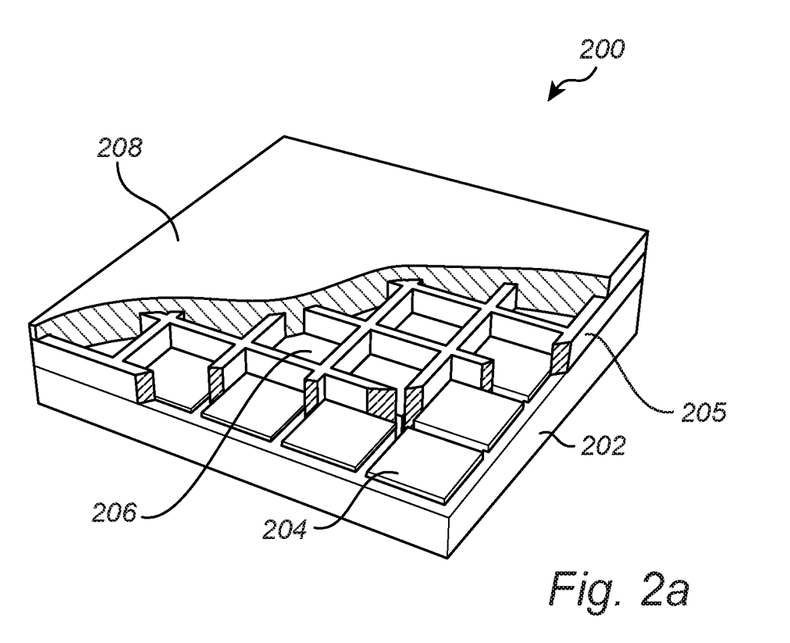
FIGS. 2a-b schematically illustrate a fingerprint sensing device according to an embodiment of the invention.

FIG. 2 is a schematic illustration of a fingerprint sensing device 200 according to an embodiment of the invention. The exterior surface of the sensing device 200 is referred to as the sensing surface, since that is the surface where a finger will be placed for capturing a fingerprint image. The fingerprint sensing device is based on a sensing chip 202 comprising an array of sensing elements 204. The sensing elements 204 are here shown arranged in a square array, the sensing elements having a size of about 50×50 µm and a distance between adjacent elements is about 5 µm. The sensing elements 204 are electrically conductive, typically metallic, and can as a general approximation be considered to act as one plate in a parallel plate capacitor, where a finger placed on a sensing surface of the fingerprint sensing device 200 represents the other plate. Each sensing element 204 is connected to readout circuitry (not shown) for detecting a capacitive coupling between each of said sensing elements 204 and a finger placed on the sensing surface 201.

A coating material 205 is arranged in a layer on top of the array of sensing elements 204, and the coating material comprises a plurality of cavities 206 which are filled by a mold material 208 covering and protecting the sensing elements 204, thereby forming the outer surface of the fingerprint sensor 200.

Figure 2B:
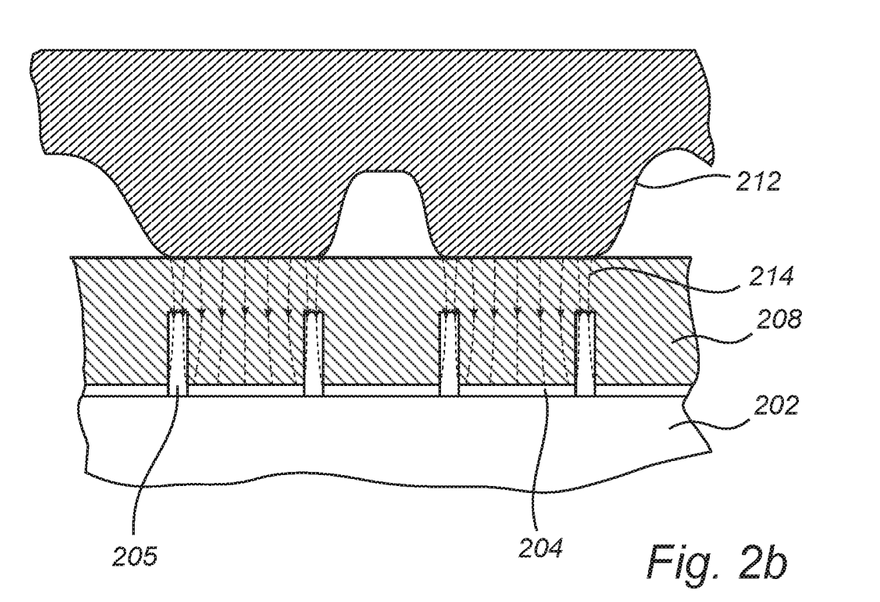

The cavity 206 may also be referred to as an opening, or a recess, in the coating material 205. The purpose of the cavities 206 is to allow a mold material to be arranged directly above the sensing elements 204, but not in the areas in between sensing elements, so that the mold material 208 is arranged between the sensing element 204 and the sensing surface 201 in the vertical direction. The mold material 208, which has a dielectric constant that is higher than a dielectric constant of the coating material 205, will then act as a focusing element helping to focus the electromagnetic field lines between a finger and the sensing element 204 towards the sensing element 204. This effect is further illustrated in FIG. 2b showing a side view of the fingerprint sensing device 200 where a ridges and valleys of a finger 212 are located on the sensing surface 201. It can be seen that the field lines 214 originating in a position on the sensing surface not located directly above a sensing element 204 are curved towards the cavities in the coating comprising the mold material 208 due to the higher dielectric constant of the mold material 208. Moreover, the coating material 205 having a lower dielectric constant than the mold material 208 acts as a blocking structure in order to reduce or prevent field lines from a fingerprint ridge reaching a sensing element 204 not located directly beneath the ridge. Accordingly, the patterned coating layer 205 helps to reduce or prevent blurring of a captured image, since the non-vertical coupling between the finger 212 and the sensing elements 204 is reduced. In FIG. 2b, the field is lower in the coating material 205 compared to in the mold material 208, due to the difference in dielectric constant.

In principle, it is the ratio between the dielectric constants of the coating material 205 and the mold material 208 which determines the distribution of the field lines. Already a ratio of 2:1 provides an advantageous effect, whereas a ratio in the range of 1:10 to 1:20 is more preferable. The dielectric constants of the materials discussed herein are the average relative dielectric constants of the material. The respective materials may for example be compositions and comprise particles having individually different dielectric constants, which together with the bulk material provide a resulting average dielectric constant. For example, a mold material with an increased dielectric constant can be achieved by using a conventional mold material and by adding particles of a ferroelectric material such as barium titanate ($BaTiO_3$) which in itself has a dielectric constant above 1000. By selecting the type and concentration of the added dielectric material, the mold material and also the coating material can be tailored to have the desired dielectric constant within a reasonable range, such as between 2 and 100. The resulting dielectric constant $\in_{eff}$ for a mixture of components having different dielectric constants $\in_1$, $\in_2$, can be determined according to the Lichtenecker model as $$\log \in_{eff} = v_1 \log \in_1 + v_2 \log \in_2$$

where $v_1$ and $v_2$ are empirically determined constants.

Figure 3A:
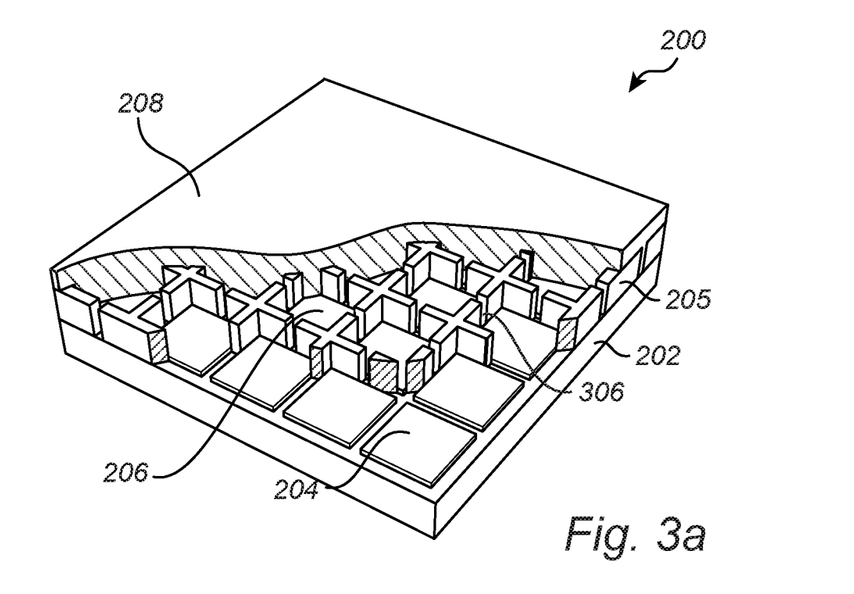
FIGS. 3a-b schematically illustrate a fingerprint sensing device according to embodiments of the invention.

FIG. 3a is a schematic illustration of a fingerprint sensing device according to an embodiment of the invention where adjacent cavities 206 in the coating material are connected via channels 306, or openings 306, in the side walls of the cavities. The channels 306 allow a liquid mold to flow between adjacent cavities during compression molding, as will be discussed in further detail in relation the method for manufacturing a fingerprint sensing device. The openings 306 between adjacent cavities are configured to be larger than the particle size of any filler particles present in the mold material 208, so that the mold can flow freely between the cavities without the risk of filler particles clogging the openings. Preferably, the openings have a size larger than a maximum size of the filler particles. A typical maximum particle size may be in the range of 1-3 µm for ferroelectric particles such as $BaTiO_3$ particles. However, filler particles having a high dielectric constant may also be provided in the form of nanoparticles having a sub-µm diameter. Accordingly, the openings 306 between adjacent cavities can be selected based on the size of the filler particles and based on the method for patterning the coating layer, and a practical size of the openings 306 may be in the range of 5-10 µm. Furthermore, the mold material 208 may comprise additional filler particles in order to tailor parameters such as the viscosity and the thermal expansion coefficient of the mold material. The openings may be adapted to have a size larger than a maximum size of also such filler particles. However, it is prioritized to ensure that dielectric particles influencing the dielectric constant of the mold can flow freely so that a homogeneous dielectric constant can be achieved in the mold over the full area of the sensing chip.

Figure 3B:
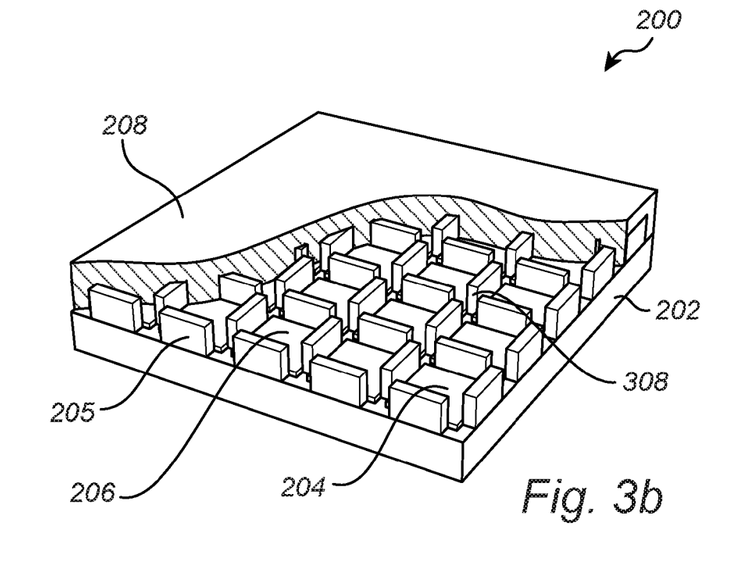

FIG. 3b is a schematic illustration of a fingerprint sensing device according to an embodiment of the invention where the openings 308 connecting adjacent cavities 206 in the coating material are located at the corners of the sensing elements 204, i.e. in the corners of the cavities 206. It should be understood that the openings connecting adjacent cavities may be configured in many different ways to achieve the desired effect of allowing the mold to flow between adjacent cavities.

Figure 4:
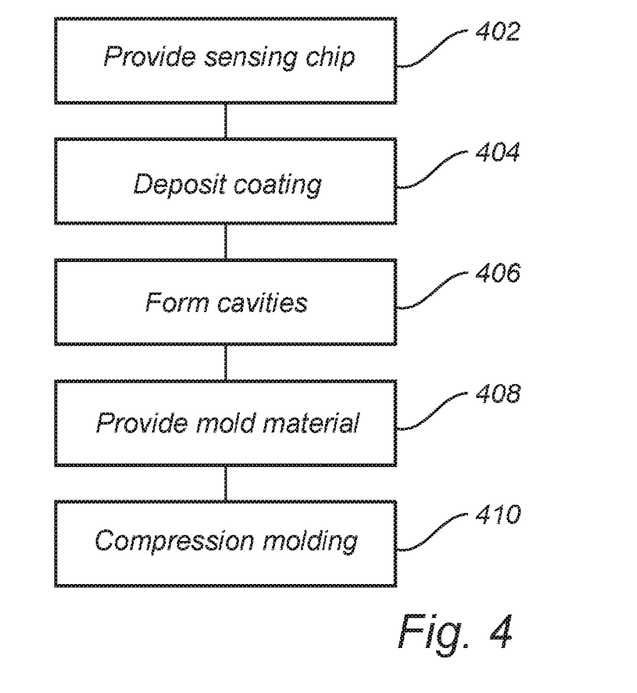
FIG. 4 is a flow chart outlining the general steps of a method for manufacturing a fingerprint sensing device according to an embodiment of the invention.

FIG. 4 is a flow chart outlining the general steps of a manufacturing method according to an embodiment of the invention. The manufacturing method will be discussed also with reference to FIGS. 5a-d.

First, in step 402, a sensing chip 202 is provided and a coating layer is deposited 404 onto the sensing chip 202. The coating layer typically has a uniform thickness and is arranged to cover the entire area of the sensing chip. The coating layer can for example be a photoresist deposited by spin coating, and the photoresist may be either a positive or a negative photoresist.

Figure 5A:
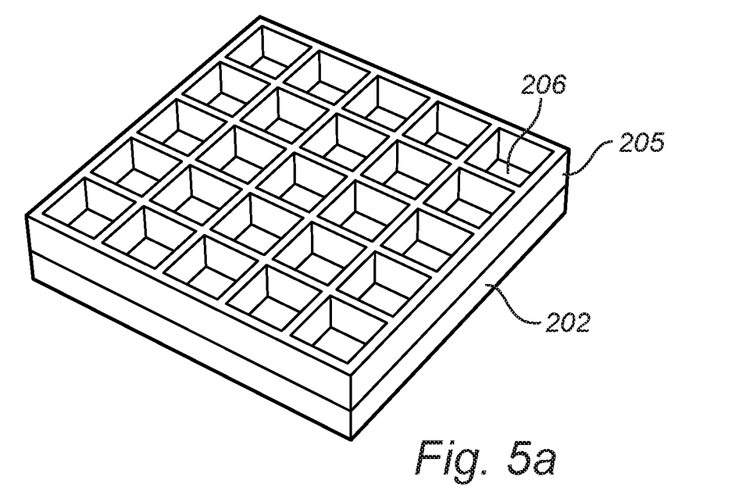
FIGS. 5a-d schematically illustrate a method for manufacturing a fingerprint sensing device according to an embodiment of the invention.

Cavities 206 are formed 406 in the coating layer 205 by means of conventional photolithography and subsequent development to form cavities having the desired shape and distribution, as exemplified in FIG. 5a. Typically, the cavities are configured to reach through the coating layer to expose the sensing element. Moreover, the sensing element may be covered by a silicon nitride-based passivation layer (not shown) which is well known in the field of CMOS-processing. However, a certain small thickness of the coating material remaining in the cavities would not substantially influence the overall properties of the sensing device 200. In general, each cavity 206 is centered above a corresponding sensing element 204, having the same shape as the sensing element 204, and the size of the cavity is preferably as close as possible to the size of the sensing element 204. However, the remaining side walls between cavities must be sufficiently thick so as to maintain structural stability. As an example, for sensing elements having a size of 50×50 μm, the coating layer has a thickness of approximately 30 μm and the cavities preferably have a size in the range of 30×30 to 40×40 μm.

After forming the cavities 206, the coating layer 205 may be treated in a plasma cleaning process in order to improve wetting of the surface and to improve adhesion between the coating and the subsequently deposited mold material. The plasma cleaning may for example comprise oxygen mixed with an inert gas such as nitrogen or argon.

Figure 5B:
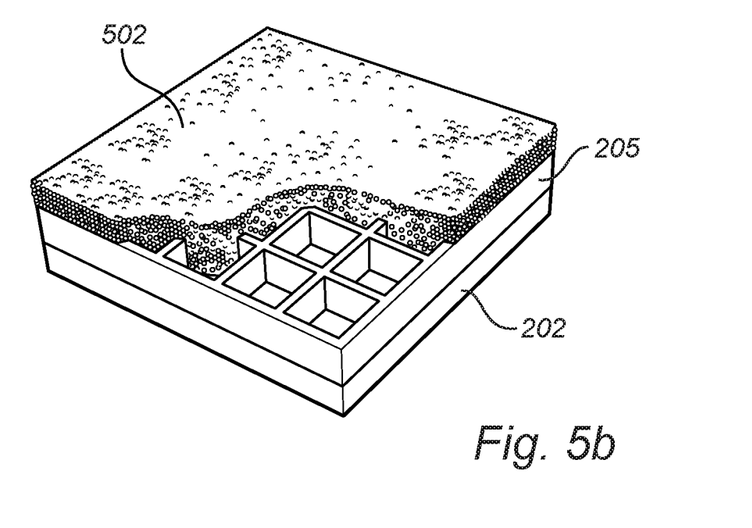

As a next step, mold granules 502 are deposited onto the coating layer 205 so that the granules 502 fills the cavities, as illustrated in FIG. 5b.

Figure 5C:
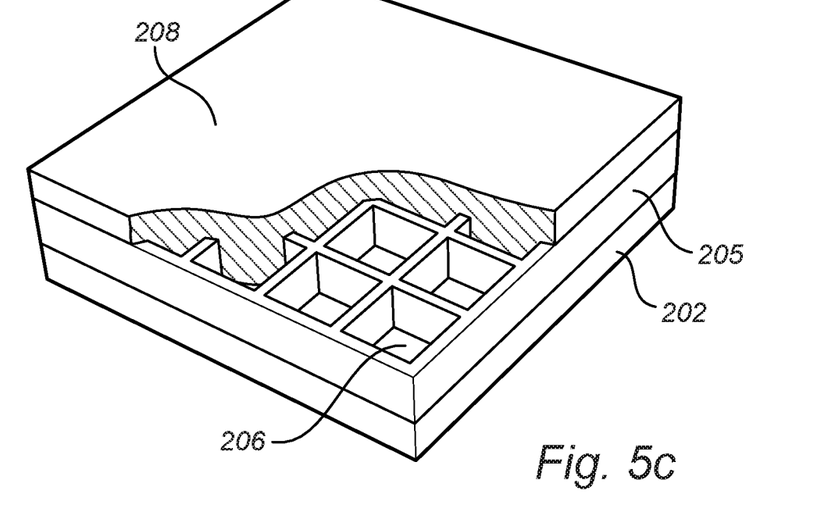

Next, the mold granules 502 are heated and pressure is applied so that the mold material melts and the melted mold material is thereby pressed into the cavities so that the cavities are filled with the mold material 208 as illustrated in FIG. 5c.

Figure 5D:
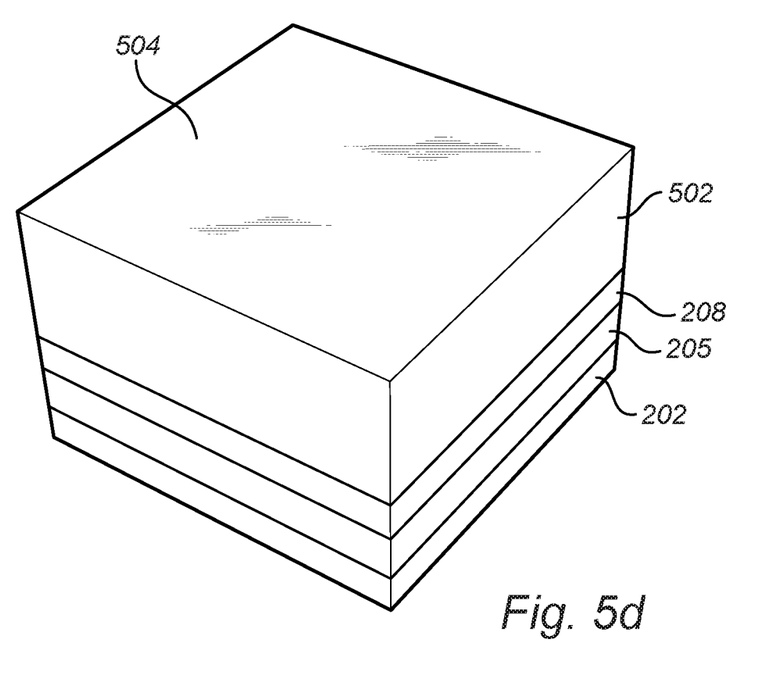

An optional manufacturing step is illustrated in FIG. 5d, where a protective plate 502 is attached to the sensing device by means of an adhesive arranged between the mold material 208 and the protective plate 502. In the device comprising a protective plate 502, the exterior surface 504 of the protective plate forms the sensing surface of the sensing device. The protective plate 502 may for example be a sapphire plate having a thickness in the range of 100-1000 μm. The protective plate 502 may also be the cover glass in a handheld device comprising a touch screen, and a cover glass covering the fingerprint sensing device may also be covering the display and touchscreen portions of the handheld device. In principle, the protective plate may be any structure which acts to cover and protect the sensing device while still allowing a capacitive coupling between a finger placed on the surface of the protective plate and the sensing elements.

Figure 6:
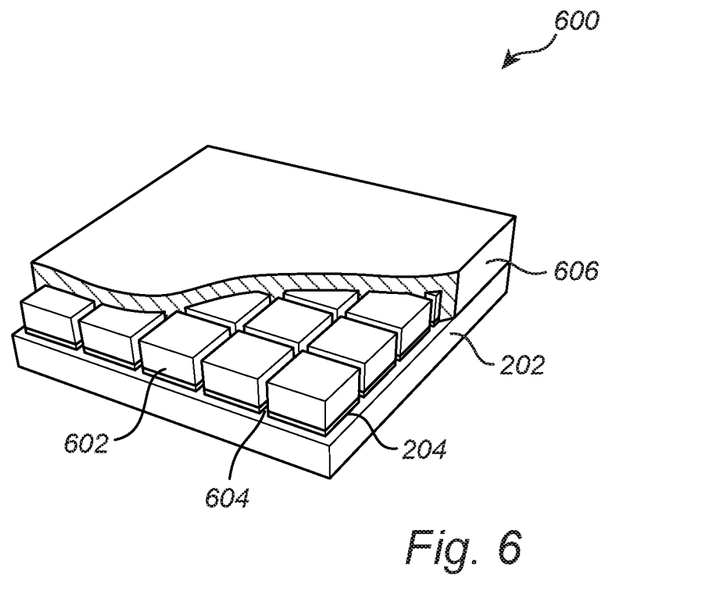
FIG. 6 schematically illustrates a fingerprint sensing device according to an embodiment of the invention.

FIG. 6 is a schematic illustration of a fingerprint sensing device 600 according to another embodiment of the invention. The fingerprint sensing device is based on a sensing chip 202 comprising a square array of sensing elements 204.

In many aspects, the sensing device 600 of FIG. 6 is similar to the sensing device of FIG. 2a. However, the sensing device 600 comprises a coating layer 602 having a plurality of trenches 604 filled with a mold material 606. The trenches 604 are aligned with areas between the sensing elements 204. Moreover, the dielectric constant of the mold material 606 is lower than a dielectric constant of the material of the coating layer 602. The coating 602, will then act as a focusing element helping to focus the electromagnetic field lines between a finger and the sensing element 204 towards the sensing element 204 in a similar manner as discussed in relation to FIGS. 2a and 2b. Moreover, the dielectric constant of the coating can be tailored using dielectric filler particles in the same manner as discussed above for the mold material.

Figure 7:
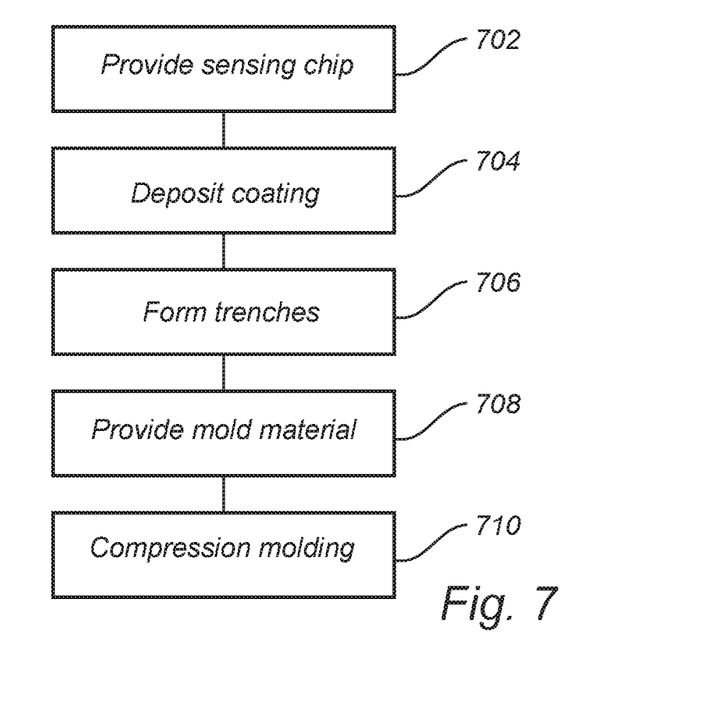
FIG. 7 is a flow chart outlining the general steps of a method for manufacturing a fingerprint sensing device according to an embodiment of the invention.

FIG. 7 is a flow chart outlining the general steps of a manufacturing method according to an embodiment of the invention. The manufacturing method will be discussed also with reference to FIGS. 8a-c.

First, in step 702, a sensing chip 202 is provided and next a coating layer is deposited 704 onto the sensing chip 202. The coating layer typically has a uniform thickness and is arranged to cover the entire area of the sensing chip including the sensing elements 204. The coating layer can for example be a photoresist deposited by spin coating, and the photoresist may be either a positive or a negative photoresist. In order to achieve a coating material having a dielectric constant higher than the dielectric constant of the mold material, dielectric filler particles may be mixed with the coating material. The dielectric filler particles can be similar to the filler particles discussed above in relation to the embodiment illustrated by FIGS. 2a-b.

Figure 8A:
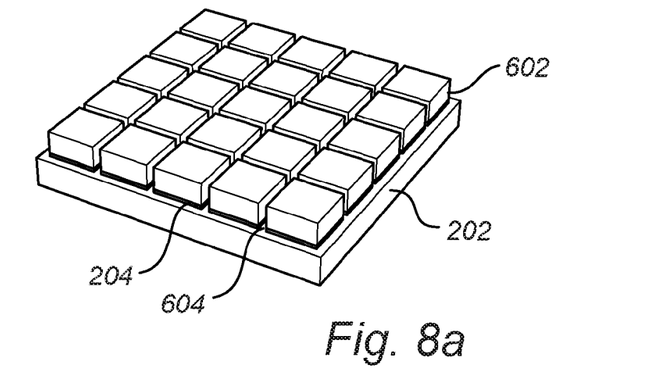
FIGS. 8a-c schematically illustrate a method for manufacturing a fingerprint sensing device according to an embodiment of the invention.

Trenches 604 are formed 706 in the coating layer by means of conventional photolithography and subsequent development to form trenches having the desired shape and orientation, as exemplified in FIG. 8a. In general, trenches are aligned with areas between the sensing elements 204. The remaining coating 602 thus form square structures arranged on top of and aligned with the sensing elements 204.

Figure 8B:
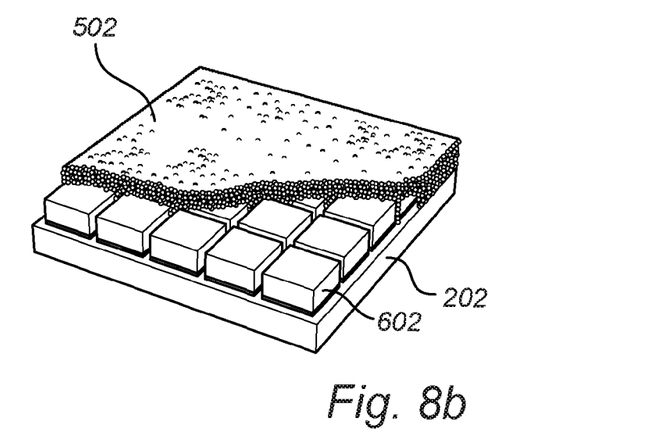

After forming the trenches in the coating layer, the mold granules 502 are provided 708 as illustrated in FIG. 8b. It should be noted that in this embodiment, the mold material does not need to comprise filler particles having a dielectric constant higher than the remainder of the mold material.

Figure 8C:
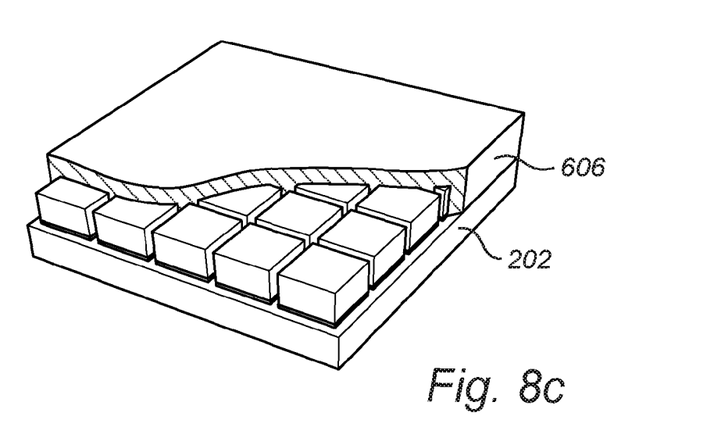

Next, the mold granules are compression molded 710 so that the mold material fills the trenches in the coating, as illustrated in FIG. 8c.

Figure 9:
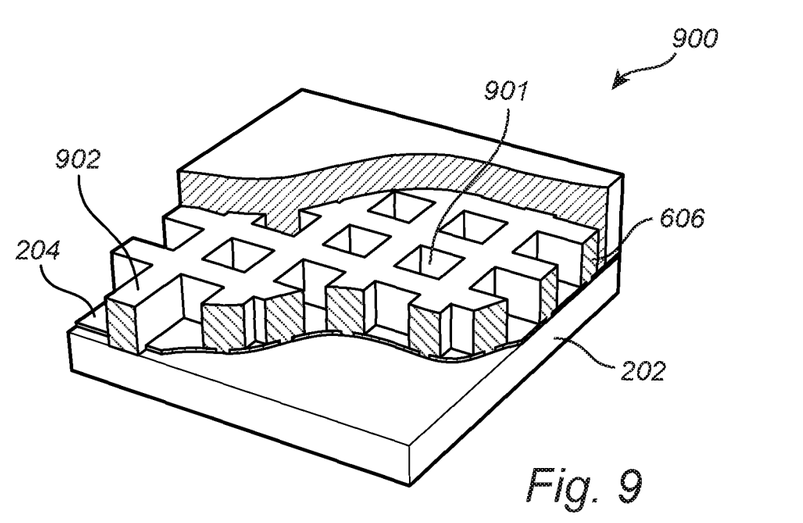
FIG. 9 schematically illustrates a fingerprint sensing device according to an embodiment of the invention.

FIG. 9 schematically illustrates a fingerprint sensing device 900 according to an embodiment of the invention. In most respects, the sensing device 900 is similar to the sensing device illustrated in FIG. 2a. However, in the sensing device of FIG. 9, the cavities are smaller, meaning that the side walls 902 surrounding the cavities are thicker, and that they extend out over the sensing elements 204. In order to ensure sufficient structural stability of the side walls 902, it may be desirable to have side walls 902 which are thicker than the distance between adjacent elements. The thickness of the side wall may also be selected based on the technology used to form the pattern in the coating layer. Furthermore, the advantageous effects relating to the higher dielectric constant of the mold material in the cavities remains also for smaller cavities, although the effect is approximately proportional to the size of the cavities.

The above example embodiments have been described using a photoresist as the coating layer. However, various advantages of the present inventive concept are achievable using another coating material. For example, the coating material may comprise a deposited hard mask which is subsequently patterned by for example deep reactive ion etching (DRIE).

Figure 10A:
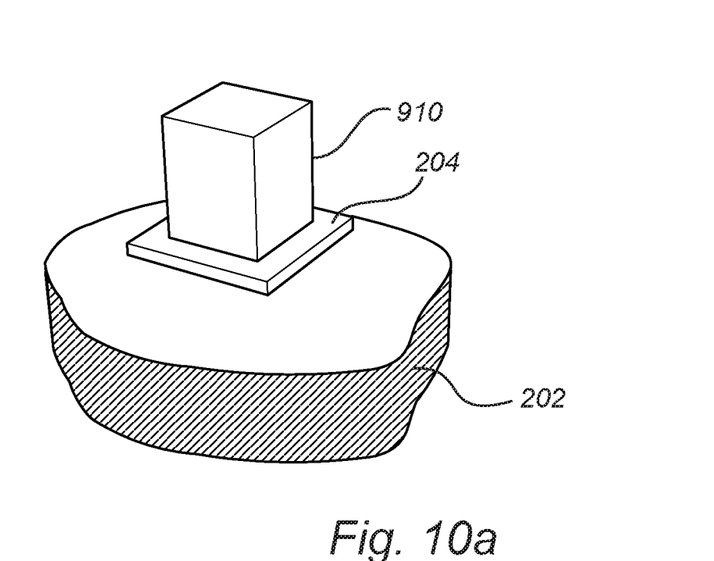
FIGS. 10a-b schematically illustrate details of a fingerprint sensing device according to embodiments of the invention.
Figure 10B:
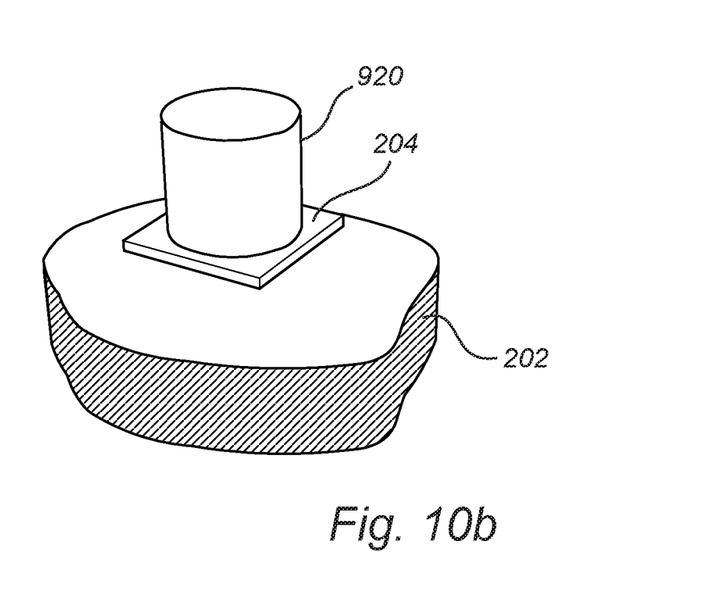

FIG. 10a is a schematic illustration of a sensing element 204 of a sensing device. Here, a rectangular cuboid structure 910 representing either coating or mold according to the various embodiments discussed above is arranged on the sensing element 204. In FIG. 10b, a cylindrical structure 920 representing either coating or mold according to the various embodiments discussed above is arranged on the sensing element 204. FIGS. 10a-b are meant to illustrate that the portion located above the sensing element, and which has a higher dielectric constant that the dielectric constant of a surrounding material, may in principle have an arbitrary shape. The shape may for example be selected based on what is most desirable from a manufacturing perspective.

It should be noted that the general aspects of the invention discussed herein are not limited to the specific dimensions and sizes disclosed in the present description. The above description merely provides an example embodiment of the inventive concepts as defined by the claims.

Even though the invention has been described with reference to specific exemplifying embodiments thereof, many different alterations, modifications and the like will become apparent for those skilled in the art. Also, it should be noted that parts of the device and method may be omitted, interchanged or arranged in various ways, the device and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A fingerprint sensing device comprising:
a sensing chip comprising an array of sensing elements, said sensing elements being configured to be connected to readout circuitry for detecting a capacitive coupling between each of said sensing elements and a finger placed on a sensing surface of said sensing device;
a coating material arranged in a layer on top of said array of sensing elements, said coating material comprising a plurality of cavities filled with a mold material, wherein said mold material is deposited by compression molding; wherein locations of said cavities correspond to locations of said sensing elements, such that a cross-section area of a cavity covers at least a portion of an area of a corresponding sensing element, said cavities comprising openings between adjacent cavities so that a liquid mold can flow between adjacent cavities during compression molding; and wherein a dielectric constant of said mold material is higher than a dielectric constant of said coating material.

2. The device according to claim 1, wherein a ratio between said dielectric constant of said mold and said dielectric constant of said coating material is equal to or larger than 2:1.

3. The device according to claim 1, wherein said mold material comprises filler particles having a dielectric constant higher than an average dielectric constant of said mold material.

4. The device according to claim 3, wherein said filler particles comprise a ferroelectric material.

5. The device according to claim 3, wherein said openings are larger than a maximum size of said filler particles in said mold material.

6. The device according to any claim 1, further comprising: a protective plate attached to said fingerprint sensing device by means of an adhesive.

7. A method for manufacturing a fingerprint sensing device, said method comprising:
providing a sensing chip comprising an array of sensing elements, said sensing elements being configured to be connected to readout circuitry for detecting a capacitive coupling between each of said sensing elements and a finger placed on a sensing surface of said sensing device;
depositing a layer of a coating material covering said array of conductive sensing elements;
forming a plurality of cavities in said coating material, wherein locations of said cavities correspond to locations of said sensing elements such that a cross-section area of a cavity covers at least a portion of an area of a corresponding sensing element and wherein forming said cavities comprises forming openings between adjacent cavities so that a liquid mold can flow between adjacent cavities during compression molding; and
filling said cavities with a mold material, wherein said step of filling said cavities with the mold material comprises compression molding and wherein a dielectric constant of said mold material is higher than a dielectric constant of said coating material.

8. The method according to claim 7, wherein said step of compression molding comprises:
dispensing granulated mold particles on said layer of coating and in said cavities;
heating said granulated mold particles; and
applying a pressure to said granulated mold particles.

9. The method according to claim 7, wherein said layer of coating material is deposited by spin coating or by spray coating.

10. The method according to claim 7, wherein the dielectric constant of said mold material is in the range of 5 to 100.

11. The method according to claim 7, wherein the dielectric constant of said coating material is in the range of 2 to 5.

12. The method according to claim 7, wherein a ratio between said dielectric constant of said mold and said dielectric constant of said coating material is equal to or larger than 2:1.

13. The method according to claim 7, wherein said mold material comprises filler particles having a dielectric constant higher than an average dielectric constant of said mold material.

14. The method according to claim 13, wherein said filler particles comprise a ferroelectric material.

15. The method according to claim 13, wherein said openings are larger than a maximum size of said filler particles in said mold material.

16. The method according to claim 7, wherein said coating material is a photoresist and wherein forming a plurality of cavities in said coating material comprises patterning said layer of coating material by photolithography.

17. The method according to claim 7, further comprising plasma cleaning of said coating material prior to the step of providing said mold material.

18. The method according to claim 7, further comprising:
depositing an adhesive on said mold material; and
attaching a protective plate to said fingerprint sensing device by means of said adhesive.

* * * * *